Dec. 22, 1970     D. RÖTZEL     3,549,997
FREQUENCY DEVIATION MEASURING SYSTEM
Filed July 3, 1968
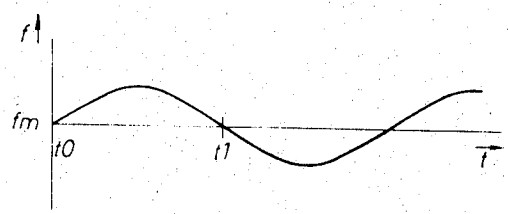
Fig.1a
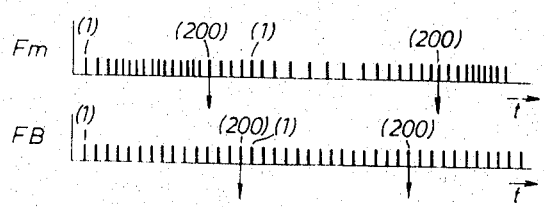
Fig.1b
Fig.1c
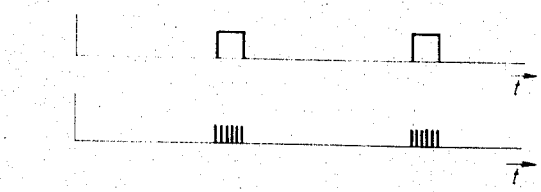
Fig.1d
Fig.1e
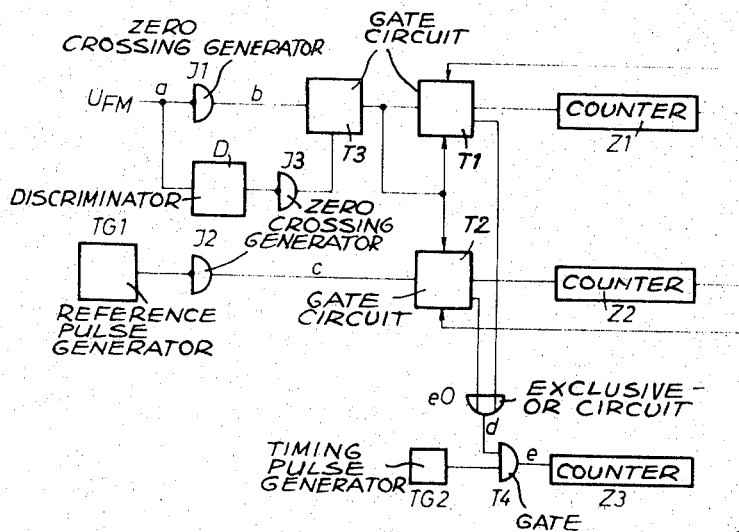
Fig.2
INVENTOR
DIETHELM RÖTZEL
BY *[signature]*
ATTORNEY

United States Patent Office 3,549,997
Patented Dec. 22, 1970

3,549,997
FREQUENCY DEVIATION MEASURING SYSTEM
Diethelm Rötzel, Korntal, Germany, assignor to International Standard Electric Corporation, New York, N.Y., a corporation of Delaware
Filed July 3, 1968, Ser. No. 742,241
Claims priority, application Germany, July 19, 1967, 1,591,618
Int. Cl. G01r 23/02
U.S. Cl. 324—79                              1 Claim

ABSTRACT OF THE DISCLOSURE

A frequency deviation measuring system wherein an FM signal and a reference signal are separately used to derive zero crossing pulses which are separately coupled to counters via gates. The FM signal is additionally coupled to a pulse shaper via a discriminator which generates a pulse which opens the gates to initiate counting. The gates are separately closed by the counters when they have reached a predetermined count. The time elapsing between the closing of the respective gates is a measure of the frequency deviation. The time is measured by coupling the gate-closing signals via an EXCLUSIVE-OR circuit to a gate which allows pulses from a timing pulse generator to reach a direct reading counter.

BACKGROUND OF THE INVENTION

Field of the invention

The present invention relates to a frequency deviation measuring system.

Description of the prior art

It is frequently necessary to determine the frequency deviation of a frequency modulated or phase modulated signal. In the past, the output voltage of a frequency discriminator has been used to measure frequency deviation. A second known or used method requires the measurement of the zero positions of signals in the frequency spectrum of the FM signal.

It is an object of this invention to provide an improved system for measuring frequency deviation which features accuray and simplicity.

SUMMARY OF THE INVENTION

According to the invention, a frequency deviation measuring system comprises, a source of a frequency modulated signal, a first zero crossing pulse generator coupled to said source for generating pulses in response to said frequency modulated signal, means for coupling said zero crossing pulses to a first counter, which counter provides a first control signal when a predetermined count is reached, means for generating a periodic reference signal, means for coupling said periodic reference signal to a second counter which provides a signal when a predetermined count of the cycles of said reference signal is reached, means for determining the time elapsed between said predetermined counts and means for periodically initiating the count by said counters.

BRIEF DESCRIPTION OF THE DRAWINGS

The above mentioned and other objects of this invention will become apparent by references to the following description in conjunction with the accompanying drawings:

FIG. 1a illustrates the wave form of the modulating frequency of the FM signal.

FIG. 1b illustrates the waveform of zero crossing pulses derived from the FM signal and zero crossing pulses derived from the modulating frequency.

FIG. 1c illustrates the waveform of zero crossing pulses derived from a reference signal.

FIG. 1d illustrates the waveform appearing at the output of the EXCLUSIVE-OR circuit.

FIG. 1e illustrates the waveform of signals appearing at the input to a counter whose reading is a measure of deviation; and FIG. 2 is a block and schematic diagram of the preferred embodiment of the present invention illustrating a frequency deviation measuring system.

DESCRIPTION OF THE PREFERRED EMBODIMENTS

According to the invention, during each zero crossing ($t_o$) of the modulating frequency, as illustrated in FIG. 1a, a first pulse sequence derived from a reference signal of a frequency equal to the carrier frequency of the received FM signal and a second pulse sequence derived from the FM signal, are applied to separate counters. Each of said counters renders a criterion at a defined count which is, in this case, equal for both counters. If the deviation is equal to zero, both counters will reach the defined count at the same time, but if there exists a deviation, then the counter counting pulses derived from the signal to be measured will reach the defined count first. This is due to the fact that the average frequency during the positive half cycle of the modulating signal is higher than the center frequency and consequently the reference frequency. During the negative half-wave of the modulating signal, the situation would be reversed, that is, the counter being driven with zero crossing pulses derived from the reference signal would terminate its count first. The time elapsing between the occurrence of the defined count in each counter respectively, when measured, yields the value of the deviation. This is accomplished with the aid of another counter which receives pulses from a separate pulse generator only during the time to be measured.

In order to reduce the effects of short-time fluctuations, the deviation is determined by taking an average value of the measurements.

If the deviation is determined successively during a positive and negative half-wave of the modulating signal, the functions of the start and stop signals for the time interval measured are interchanged without adversely affecting the measurement.

FIG. 2 illustrates a schematic block diagram of an embodiment used to measure deviation. In this figure points are designated at which signals appear as illustrated in FIG. 1, by using the same reference letters. The frequency modulated signal $U_{FM}$ is applied to a zero crossing generator J1, from which timing pulses are derived. These timing pulses, see FIG. 1b, are applied to a gate circuit T3. The reference signal $U_b$, produced by reference pulse generator TG1, is applied in the same way to a zero crossing generator J2 and the timing pulses derived therefrom, as shown in FIG. 1c are applied to gate circuit T2. The signal $U_{FM}$ is an addition demodulated in the frequency discriminator D and connected to zero crossing generator J3 to produce pulses whenever the modulating signal is zero. A pulse furnished by the pulse shaper J3, at the moment $t_0$, see FIG. 1a, opens the gate circuit T3. The pulse passing through the gate circuit T3 opens the gate circuits T1 and T2 via which the respective pulse sequences reach the counters 1 and 2. When the counters reach the predetermined count they furnish an output signal to gate circuits T1 and T2 which thereupon open.

Signals which characterize the state of the respective gate circuits are applied to an EXCLUSIVE-OR circuit eO. The signals, as illustrated in FIG. 1d, rendered by said EXCLUSIVE-OR circuit, control a gate circuit T4 via which the counting pulses illustrated in FIG. 1e, produced by a timing pulse generator TG2, reach a read out counter Z3. The value indicated by the counter represents a measure of the deviation.

If the reference signal has the same frequency as the center frequency, the phase of the reference signal may yield a false result. This erroneous result is due to the arbitrary appearance of the start signal. Therefore, the reference frequency may be selected substantially higher than the center frequency and subdivided behind the gate circuit T2. This dividing stage may be combined with the counter.

If the predetermined value to be counted does not correspond to the final position of a counter, a correspondingly higher counter may be used and the defined or predetermined count obtained by a preadjustment.

The circuits required for the respective restoration of the counters and for average evaluation are not shown in order to simplify the accompanying drawings.

I claim:
1. Apparatus for measuring the frequency deviation of a carrier frequency of a frequency modulated signal comprising:
- a source of said frequency modulated signal;
- a first zero crossing pulse generator coupled to said source for generating a first series of pulses in response to said frequency modulated signal;
- a frequency discriminator coupled to said signal source for producing a demodulated signal;
- a second zero crossing generator coupled to said demodulated signal for producing a second series of pulses whenever said demodulated signal is zero;
- a reference pulse generator;
- a third zero crossing generator coupled to said reference pulse generator for producing a third series of pulses whenever the signal from said reference pulse generator is zero;
- a first gate circuit;
- a second gate circuit;
- a first counter for providing a first control signal when a predetermined count is reached;
- a second counter for providing a second control signal when a predetermined count of the cycles of said reference signal is reached;
- means for coupling said second series of pulses to said first and second gate circuits to enable said first and third series of pulses to be transmitted from said first and third respective zero crossing generators to said first and second respective counters upon the initiation of the first of said second series of pulses;
- a timing pulse generator;
- a third gate coupled to said timing pulse generator;
- a third counter;
- an exclusive OR circuit;
- means for coupling the output of said first and second counters to said exclusive OR circuit so that a signal output is produced from said exclusive OR circuit between that period of time when one of said first and second control signals is produced by one of said first and second counters to that period of time when the other of said control signals is produced by the other of said first and second counters; and
- means for coupling the signal output of said exclusive OR circuit to said third gate to enable pulses produced by said timing pulse generator to be transmitted to said third counter whereby the count of said third counter indicates the extent of said frequency deviation.

References Cited

UNITED STATES PATENTS

| | | | |
|---|---|---|---|
| 3,039,685 | 6/1962 | Bagley et al. | 324—79X |
| 3,167,848 | 2/1965 | Abe et al. | 324—69X |
| 3,404,345 | 10/1968 | Mark et al. | 328—141 |

ALFRED E. SMITH, Examiner

U.S. Cl. X.R.

328—141